United States Patent [19]
Briles

[11] Patent Number: 4,810,142
[45] Date of Patent: Mar. 7, 1989

[54] BLIND FASTENER POSITIVELY LOCKING TO WORK

[76] Inventor: Franklin S. Briles, 230 Burma Rd., Fallbrook, Calif. 92028

[21] Appl. No.: 26,147

[22] Filed: Mar. 16, 1987

[51] Int. Cl.[4] .................. F16B 13/04; B23P 19/00
[52] U.S. Cl. ........................... 411/43; 411/34; 29/525.2
[58] Field of Search .................... 411/34–38, 411/41, 43, 54, 55, 378, 424; 403/408.1; 29/522 R, 522 A, 526 R, 526 A

[56] References Cited

U.S. PATENT DOCUMENTS

| | | | |
|---|---|---|---|
| 3,921,364 | 11/1975 | Briles | 411/424 |
| 4,012,984 | 3/1977 | Matuschek | 411/43 |
| 4,127,345 | 11/1978 | Angelosanto et al. | 403/408.1 |
| 4,170,920 | 10/1979 | Siebol | 411/43 |
| 4,370,081 | 1/1983 | Briles | 411/43 |
| 4,451,189 | 5/1984 | Pratt | 411/43 |
| 4,627,775 | 12/1986 | Dixon | 411/43 |

Primary Examiner—Neill R. Wilson
Attorney, Agent, or Firm—William W. Haefliger

[57] ABSTRACT

A tubular fastener is positively locked to a workbore and counterbore, the fastener having a tubular shank in the workbore and an annular head in the work counterbore, the head also defining a counterbore, and employing a pin received in a bore defined by said tubular shank, and a lock ring, the pin defining a peripheral recess sunk toward the pin axis; the locking is achieved by:

(a) retracting the pin relatively axially endwise in the shank by exerting axial force and transmitting force from the pin to a section of the shank projecting from the workbore to deform that section, thereby forming a bulb that grips the side of the work opposite the work counterbore, and bringing the pin recess into proximity to the head counterbore, and (b) deforming the ring to penetrate and lock into the pin recess and also within the head counterbore, and to exert radially outward force against the head, acting to radially compress the head against the work counterbore; whereby the deformed ring, the compressed head, and the pin locked to the deformed ring material together form a solid interlocked unit.

24 Claims, 7 Drawing Sheets

BLIND FASTENER POSITIVELY LOCKING TO WORK

BACKGROUND OF THE INVENTION

This invention relates generally to angle headed blind fasteners, and more particularly concerns the construction of such fasteners to overcome problems and defects stemming from fastener head and shank reception in metallic and non-metallic work bores and counterbores.

In the past, the use of angle headed fasteners to connect work panels, as for example aluminum, titanium or composite panels as employed in aircraft structure, has given rise to numerous problems. Among these were the practice of providing countersinks in the work slightly oversize in relation to the outer edges of the received fastener heads. The required removal of such material to produce the oversize countersinks resulted in undesirable notch sensitivity reduced shear bearing area, and decline of fatigue life of the structure. In this regard, most fasteners are designed to withstand shear loading, and in thin sheet applications the shear bearing area is reduced, magnifying the loading per square inch on the bearing area, thereby inducing sooner failure. Knife edge conditions associated with the countersink contribute to the problem. Also corrosion problems developed; for example, protective material filled into annular recesses about the heads tended to work loose during flexing of aircraft structures, so that corrosive fluids could gain access to the work bore along the fastener length, weakening the structure by producing corrosion and stress corrosion. Also, since the fastener head periphery does not completely engage the work bore due to the oversize relation, the development of desirable radial compression and peripheral tension in and within the elastic limits of the work material about the fastener head was not possible.

In addition, vibration induced loosening of blind fasteners connecting aircraft skins has been a very serious problem, leading to fatigue and shear failures, and corrosion problems.

SUMMARY OF THE INVENTION

It is a major object of the present invention to provide an improved blind fastener connection in or for work panels, such as aircraft skins, and which enhances stability of connected skins to resist shearing and vibration loosening, and which increases fatigue life of the connection. Basically, the invention is embodied in a tubular fastener having an axially extending tubular shank receivable in a work bore and an annular head receivable in forcible engagement with the work material forming a counterbore, and in combination with said work, the improvement comprising (a) the head having an annular end face, a first section located forwardly of said end face and having an outer annular surface to be urged in a radially outward direction to forcibly engage the work counterbore, and a second forwardly tapered section located forwardly of the first section, (b) a pin extending within the tubular shank, and a stem connected to the pin and extending endwise therefrom and from said tubular fastener, the pin sized to radially outwardy compress the tubular shank thereby acting to urge the head first section outer annular surface in said radially outward direction, as the pin is displaced in said shank toward the head, (c) means responsive to said displacement of the pin toward the head end of the fastener to expand the fastener shank at the opposite end of the fastener and axially retain the fastener in position with the head first section forcibly engaging the counterbore, (d) the head defining a first recess which is annular and sunk axially forwardly from said end face, outwardly of a cylinder defined by a bore of said tubular shank, (e) the pin defining a peripheral annular recess sunk radially inwardly and located to be brought into proximity to said first recess, and (f) an annular lock ring on the stem to be forcibly deformed to extend into both of said recesses in response to said retraction of the pin toward the head, and to exert force acting to compress the head first section against the work counterbore.

As will appear, a "two-step" connection of the head to the work counterbore is provided, the first step comprising outward radial urging of the head toward the counterbore in response to pin displacement to compressively and radially displace the tubular shank; and the second step connection of the head to the work results from driving deformation of the lock ring into the two recesses, as referred to. A very tight, vibration resistant, blind fastening of the two skins or panels is thereby provided. "One-step" head connection is also provided.

Additional features include the provision of frustoconical local taper or tapers at the tubular shank bore; the provision of dual flanges on the pin extent pulled toward a deformable section of the tubular fastener shank, and which deform that section as the shank is radially compressed as referred to, i.e. during the "first step" connection of the head to the counterbore; and the provision of annular subsections of that deformable section of the shank, for purposes as will appear.

These and other objects and advantages of the invention, as well as the details of an illustrative embodiment, will be more fully understood from the following specification an drawings, in which:

DETAILED DESCRIPTION

Figure 1:
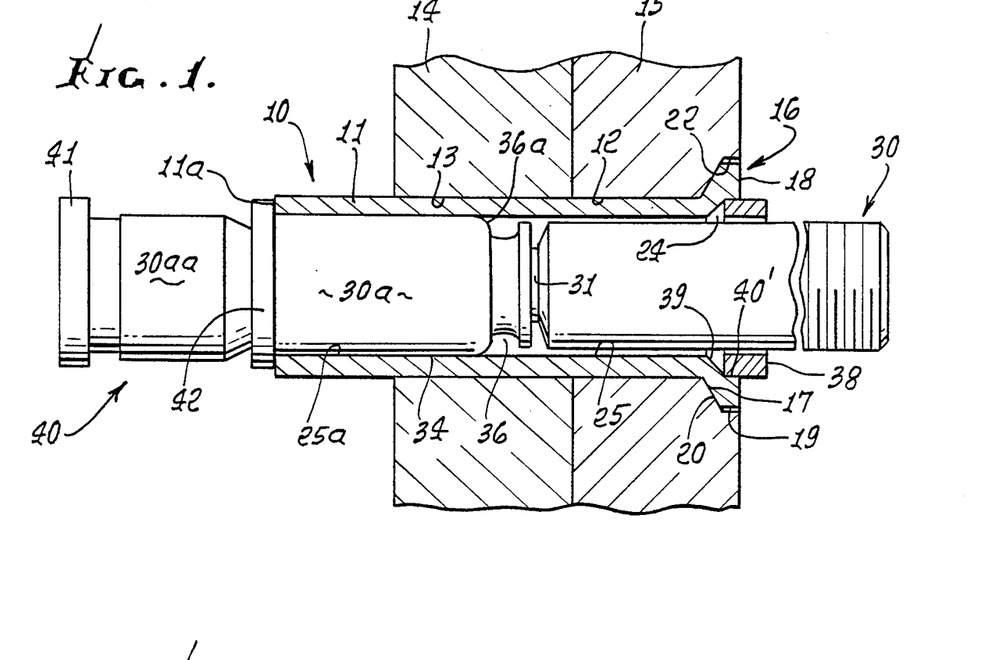
FIG. 1 is a side elevation, partly in section, showing a blind fastener incorporating the invention, after insertion into a work bore formed by two panels to be interconnected.
Figure 2:
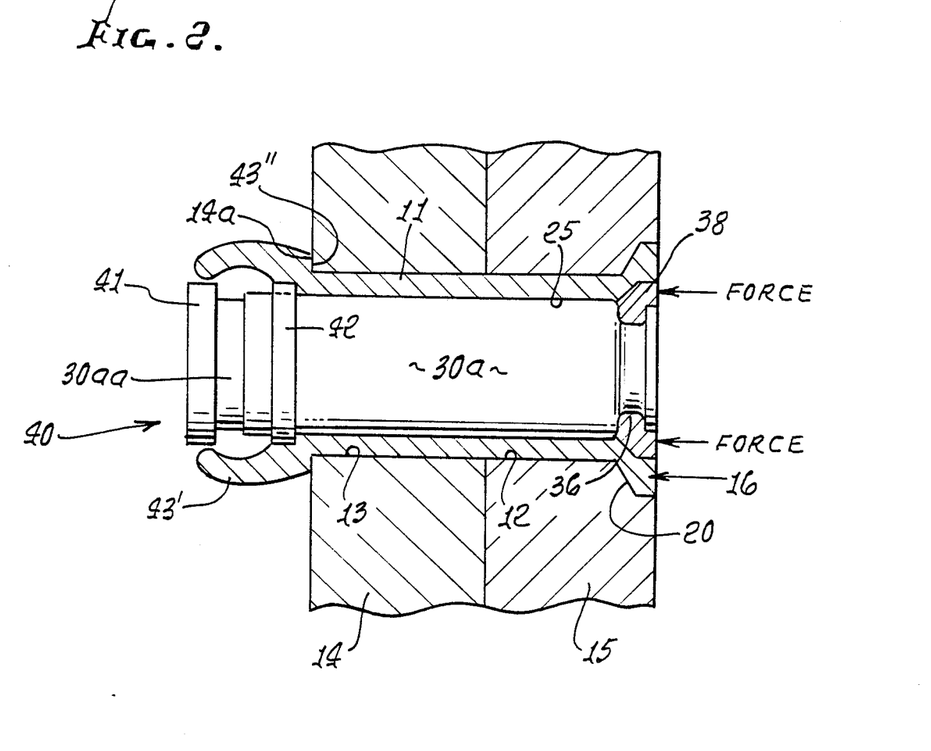
FIG. 2 is a view like FIG. 1, but showing the fastener after completed installation.

In FIGS. 1 and 2 the tubular fastener 10 has an axially extending tubular shank 11 receivable in bores 12 and 13 formed by work panels or sheets to be interconnected. The fastener also has an integral annular head 16 receivable in forcible engagement with work material forming a tapered countersink 17, and which is typically countersunk. The tubular fastener may consist of aluminum or titanium or aluminum or titanium alloys, or non-metallic such as composite materials as referred to, for example. The work panels, such as aircraft skins, may consist of metallic sheets such as aluminum or titanium, or aluminum or titanium alloys. They may alternatively consist of non-metallic sheets, and illustrative of these are non-metallic (as for example graphite or boron) panels employed in aircraft structures to overcome corrosion problems and to ensure panel composite strength. Such panels may typically incorporate a myriad of graphite, boron or synthetic resin fibers or filaments extending lengthwise in the plane of of a panel, representative filament diameters being between 0.0001 and 0.008 inches. Boron strands may for example be coated with silicon carbide, the result being known as "BORSIC". Organic matrices commonly used with boron or graphite filaments are modified epoxy resins, and organic resins such as polyamides and phenolics. Other examples are panels consisting of glass fiber, KEVLAR, polyester or epoxy resin. Panel resin may consist of polyamide, phenolic, epoxide and polyesters.

The head 16 has an end face 18, and a first section 19 having annular outer surface which is substantially cylindrical, and located immediately adjacent end face 18. The head also includes a forwardly tapered section 20 located immediately forwardly of the section 19 to engage work countersink 17. The outer surface of section 19 is adapted to be urged in a radially outward direction, in two steps, as will appear, and so as to compressively engage the corresponding cylindrical counterbore 22 formed in panel or skin 15.

The head also defines a first recess 24 which is annular and sunk axially forwardly from the end face 18, outwardly of a cylinder defined by a bore 25 of the tubular shank 11.

The fastener includes a pin 30a extending within the tubular shank bore 25a (which may be an extension of bore 25). An elongated stem 30 is endwise connected with the pin, as at reduced diameter section 31, and the stem extends endwise from the pin and from the tubular fastener to project exteriorly thereof. As will be seen, the stem is typically threaded to be pulled relatively rightwardly in FIG. 1 to drag the pin rightwardly within bores 25a and 25 of the tubular shank. The pin is sized to forcibly radially engage bores 25a and 25, as it is dragged and pulled rightwardly, outwardly compressing the tubular shank 11 toward and against work bores 13 and 12; (clearance may be prvoided between 34 and 25, or 25a, but that clearance is closed as the pin is pulled to the right) and in this process the first section 19 of head 16 is urged radially outwardly to reduce clearance between 19 and 22, or to engage counterbore 22. This is the "first step" outward urging of the head first section, as referred to above. One way to effect this is to provide an interference fit between the outer surface 34 of the pin and the bores 25a and 25 of the tubular fastener shank. For example, the nominal diameter of the pin 30a may be about 0.160 inch and the nominal diameter of bores 25a and 25 may be 0.157.

The pin has or defines a peripheral annular recess 36 sunk radially inwardly, and located to be brought into proximity to the first recess 24, as seen in FIG. 2. Note that the forward wall 36a of the recess 36 is rearwardly and annularly convex at its junction with the pin outer surface 34. That juncture 36a forms a nose tending to expand the bores 25a and 25 as the pin is displaced to the right in FIG. 1.

An annular lock ring 38 is provided on the stem 30 to be relatively slidable leftwardly on the stem as the stem is pulled rightwardly. The ring is sized to be forced against the head, within recess 24, and typically to be urged leftwardly against an annular taper 39 formed by the head adjacent the recess 24. Also the ring is forcibly deformable to extend into both recesses 24 and 36, as seen in FIG. 2, for locking to the pin and against tapered surface 39 of the tubular fastener 10. In addition, the ring expands radially, to urge the recess bore 40 radially outwardly, compressing the head first section 19 against the work bore 22. This constitutes the "second step" referred to above. Note that, since any clearance between the section 19 and bore 22 was taken up or significantly reduced by the "first step" expansion due to pin travel in bores 25a and 25, there is less radial displacement or compression of the section 19 required by the "second step" expansion effected by the lock ring, whereby a higher degree of compression of the section 19 can be achieved, to resist loosening of the connection of the fastener to the work panels. See FIG. 2.

Means is also provided to be responsive to retraction of the pin 30a toward the head end of the fastener to expand at the opposite (i.e. left end) of the fastener, and axially retain the fastener in position with head first section 19 forcibly engaging couterbore 22. Such means, generally indicated at 40, may advantageously include an end flange 41 integral with the pin and a flange 42 engaging the end 11a of the tubular shank 11. Flange 42 on the pin is relatively axially displaceable toward flange 41 on a pin section 30aa between the flanges 41 and 42. Thus, as the pin is pulled to the right, the flange 42 slides relatively leftwardly on the pin section 30aa, and also deforms the end portion 43 of the shank 11 into an axially compressed, radially thickened annulus 43', as seen in FIG. 2. The latter annulus clamps against the work panel side at 14a. Accordingly, a tight vibration resistant clamping of the panels 14 and 15 is achieved, with 43'' and 20 compressing the work and the shank compressed against the work bores to resist shearing, and to prevent entrance of corrosive fluids.

Figure 3:
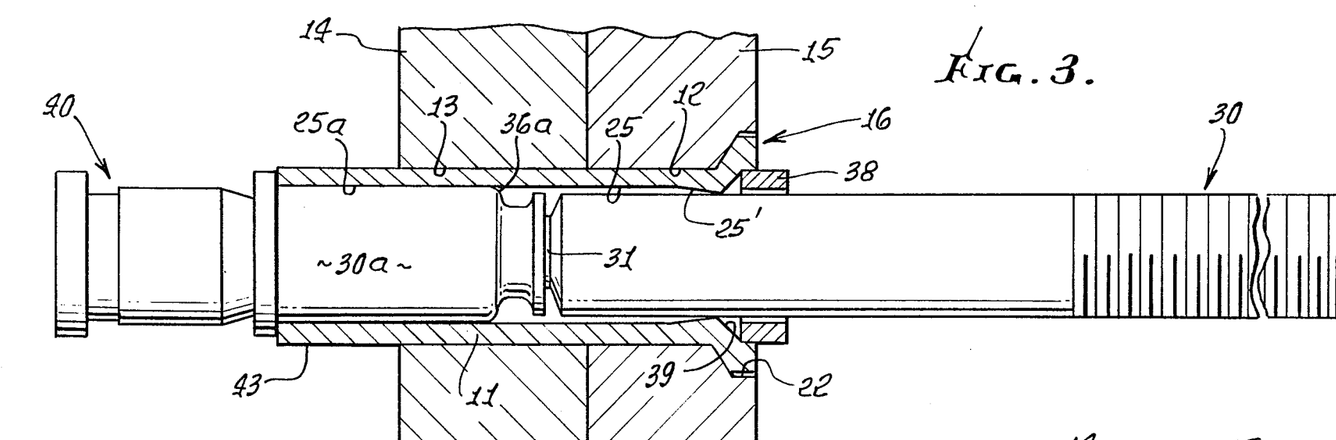
FIGS. 3 and 4 are views like FIG. 1 showing modifications.

The construction of the modified form of the invention seen in FIG. 3 is the same as in FIG. 1 (and therefore bears the same numerals) except for the following:

The tubular shank bore 25 is locally frusto-conical at 25', i.e. tapered to the right, axially toward the head 16, the taper terminating at a first locus near the tapered surface 39. Accordingly, the pin nose 36a interferes with that frusto-conical surface 25', expanding it as the pin is pulled to the right. This positively drives the head 16 radially outwardly toward the counterbore 22, in the "first step" of head expansion referred to, and also compresses the shank 11 against work bore 12. In FIG. 3, the fit on the diameter between shank 11 and bores 12 and 13 is between 0.00 and 0.010 inches.

Figure 4:
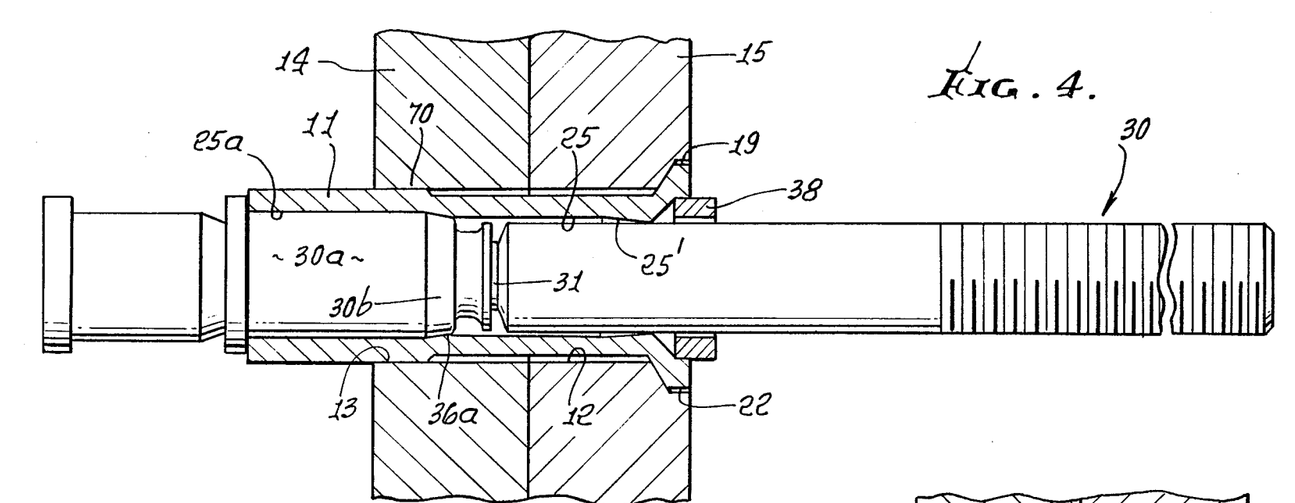

In FIG. 4, the construction is like that of FIG. 3, except that there is tapered section 30b on the pin near its forward portion and corresponding to shank taper 25' as referred to.

As a result, the pin taper 30b is forcibly engageable with the taper 25' to forcibly epxand the tubular shank toward and against the bore 13 near the head; and this, together with the expansion of the bore secures the tubular shank to the work bores 11 and 13 of the two panels even more tightly. The result is increased expansion of head surface 19 against counterbore 22. There may be clearance or interference at 20.

Figure 5:
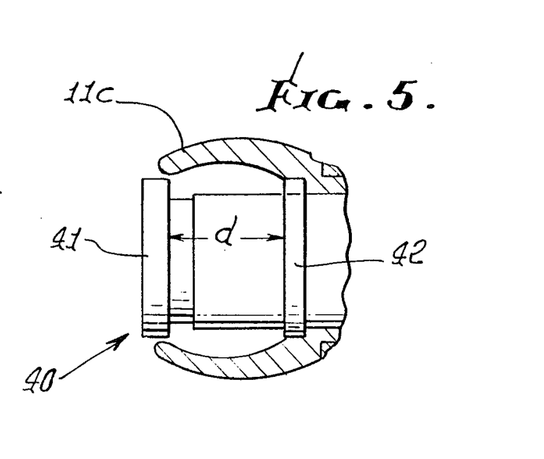
FIGS. 5 and 6 are views like FIG. 2, showing modifications.
Figure 6:
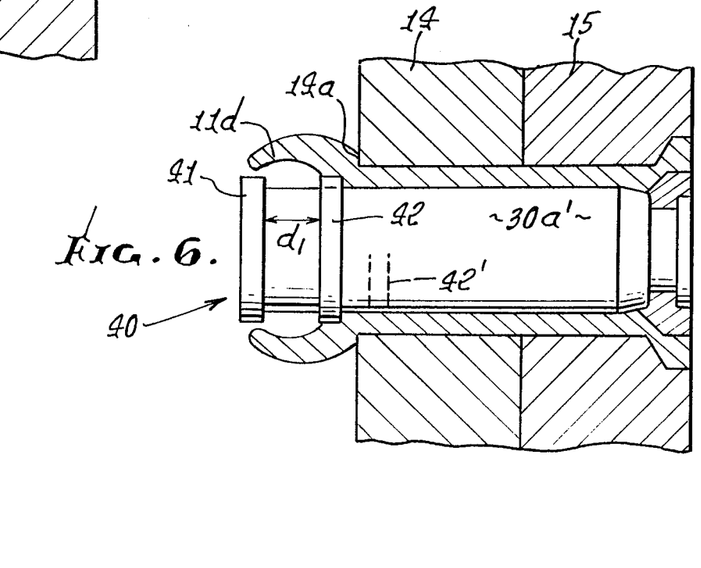

In FIG. 6, the flange 42 shears and moves to the left toward flange 41 as the pin is pulled to the right. As a result, the shank annular end section is further deformed, i.e. radially thickened at 11d, and fore-shortened, axially. The original position of the shear ring or flange 42 is indicated 42'. See also FIG. 5, showing original flange spacing d. See flange spacing "$d_1$", which results, in FIG. 6.

Figure 7:
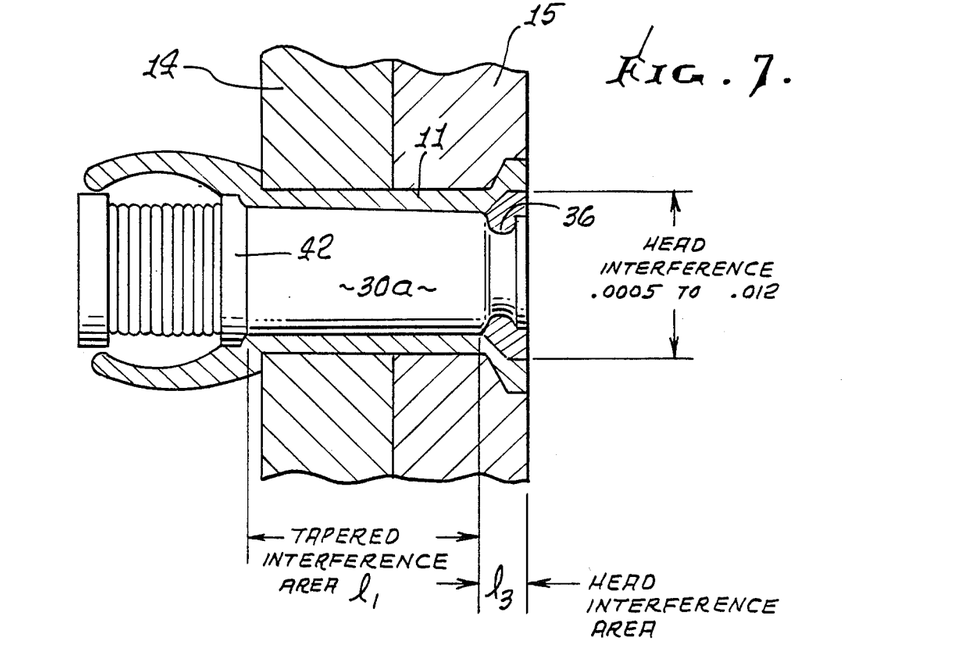
FIGS. 7 and 8 are views like 5 and 6, respectively, showing modifications.
Figure 8:
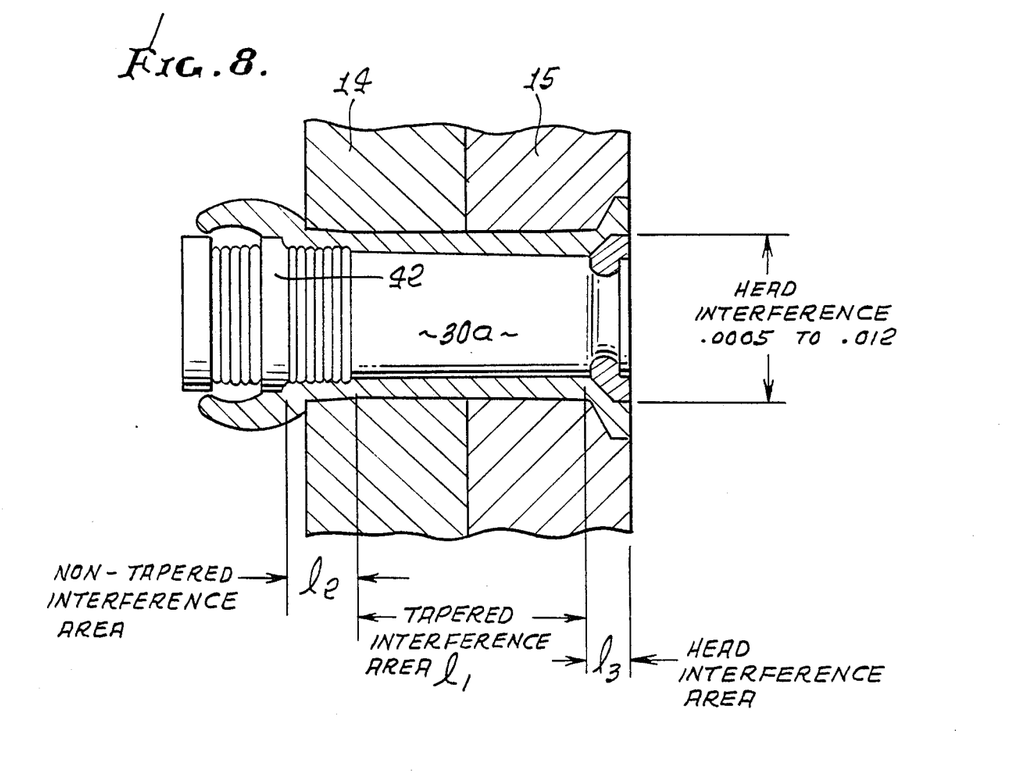

In FIGS. 7 and 8, the constructions are similar to those of FIGS. 5 and 6; however, in FIG. 7 the pin is forwardly tapered throughout its length $l_1$ between flange 42 and recess 36, to provide tapered interference with the shank 11 for radially compressing same; and in FIG. 8 the same tapered interference area $l_1$ is provided, but a non-tapered interference area of length $l_2$ is provided and flange or ring 42 pases axially over that area as section 11d is formed.

Figure 9:
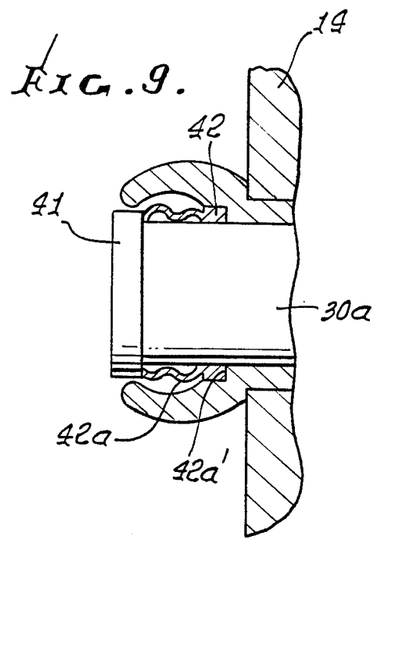
FIG. 9 is another view like FIG. 6, showing a modification.

FIG. 9, is like FIG. 5 except that ring 42 is a separate piece including a sleeve portion 42a which collapses against ring 41 as the pin is displaced forwardly. As a result, the ring 42 is confined between collapsed portion 42a and shoulder 42a' after installation is completed.

Figure 10:
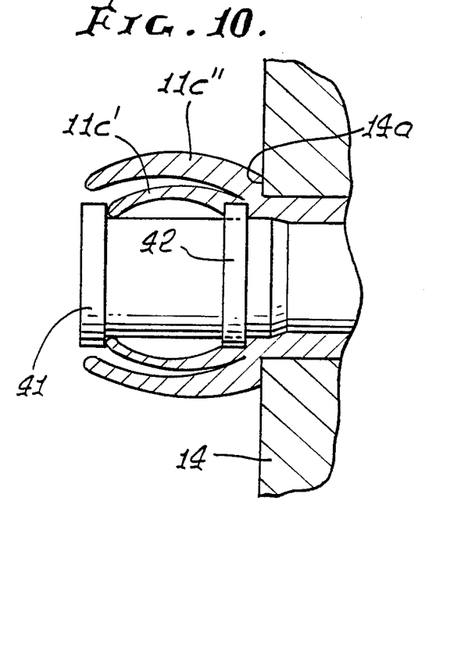
FIGS. 10 and 11 are views like 5 and 6, respectively, showing further modifications.
Figure 11:
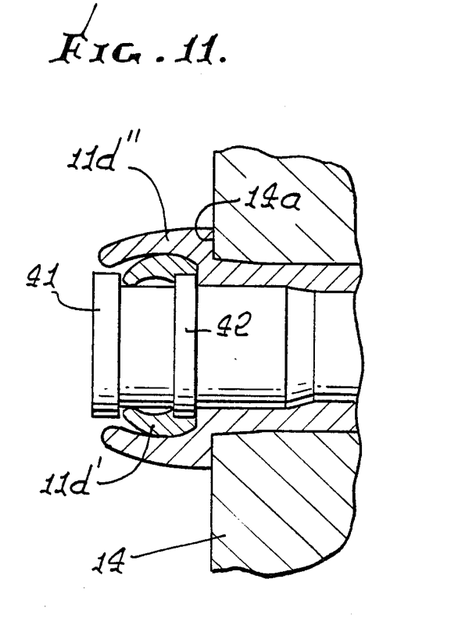

In FIG. 10, the construction is like that of FIG. 5, except that the shank end section forms radially spaced apart, annular, inner and outer sub-sections 11c' and 11c'. The grip on the panel at 14a is thereby isolated from the condition or states of the flanges 41 and 42. In FIG. 11, the construction is like that of FIG. 6, except that the shank end section forms radially spaced apart, annular, inner and outer sub-sections 11d' and 11d". The grip on the panel at 14a is again isolated from the condition or states of the flanges 41 and 42, which conditions could interfere with desired positive gripping of the panel.

Figure 12:
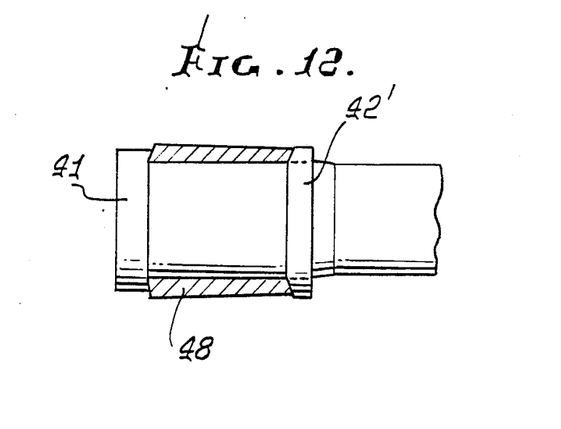
FIG. 12 is a side elevation showing a modified pin end with a sleeve between two flanges.

FIG. 12 shows that flange 42 can take the form of a separate ring 42', slidable toward flange 41 (as described above) to axially compress and outwardly deflect the sleeve 48 that extends between the flanges, thereby to form sub-sections 11c' and 11d".

The invention, then, contemplates the method of positively locking a tubular fastener to a work bore and counterbore, the fastener having a tubular shank in the bore and an annular head in said work counterbore, the head defining a counterbore, and employing a pin received in a bore defined by said tubular shank, and a lock ring, the pin defining a peripheral recess, the steps including:

(a) retracting the pin axially endwise in the shank bore in a first axial direction and in a manner to exert radially compressive loading on the tubular shank, which in turn acts to urge the head radially outwardly toward the work counterbore, (b) containing said retraction of the pin to bring the recess therein proximate the head counterbore, and (c) forcibly driving the lock ring in the opposite axial direction to deform the ring into said pin recess and in said head counterbore to exert radially compressive loading on the head compressively urging the head radially against the work counterbore.

The invention also contemplates the following method of positively locking a tubular fastener to a work bore and counterbore, the fastener having a tubular shank in the workbore and an annular head in the work counterbore, the head also defining a counterbore, the method employing a pin further defining a peripheral recess sunk toward the pin axis and the steps of the method include:

(a) retracting the pin relatively axially endwise in the shank by exerting axial force and transmitting said force from the pin to a section of the shank projecting from the work bore to deform said section, thereby forming a bulb that grips the side of the work opposite said work counterbore, and bringing said pin recess into proximity to said head counterbore, (b) deforming the ring to penetrate and lock into the pin recess and also within the head counterbore, and to exert radially outward force against the head acting to radially compress the head against the work counterbore, whereby the deformed ring, the compressed head, and the pin locked to the deformed ring material together form a solid interlocked unit.

Such a method, for example, may omit the expansion of the tubular fastner shank and head by the pin as the pin is retracted; however, the latter step may also be included to provide the assured, two-step expansion or radial compression of the head in the workbore, as referred to above. Further, the pin may have an outer surface that is tapered in axial direction toward the head, and said step (a) retraction of the pin acts to bring said tapered surface into engagement with a bore defined by the tubular shank after formation of most of the bulb, whereby continued axial retraction of the pin acts to transmit force from the pin to the tubular shank for urging the shank compressively outwardly against the work bore. The workbore may itself be tapered along length thereof facing the pin tapered surface, and pin retraction then effects controlled interengagement of the pin surface taper with the bore taper immediately to arrival of the pin recess at proximity to said head counterbore. The axial stem is rearwardly integrally connected to the pin at a break-away locus, and said retraction of the pin is effected by exerting pulling force on the stem and until the stem breaks away from the pin after the ring is deformed as set forth in step (b).

Figure 13:
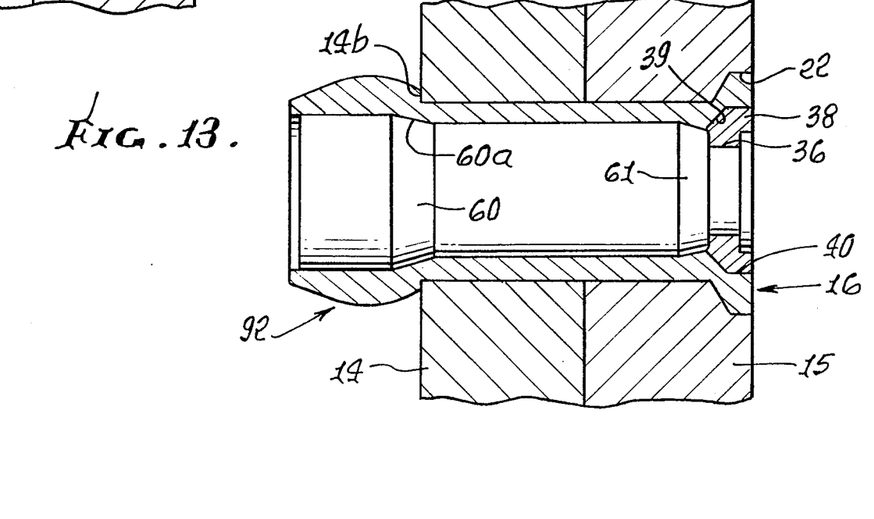
FIG. 13 is a section in elevation showing a further modified blind fastener, installed in work.

FIG. 13 is like FIG. 6, except that the pin has two local tapers at 60 and 61, and axially spaced apart. Taper 60 exerts force against the fastener shank, deforming it to a corresponding local taper at 60a, i.e. compressing shank metal toward the work annular edge at 14b. Likewise, pin taper 61 exerts force against the fastener shank deforming shank material. Simultaneously the lock ring 38 is deflected inwardly at 39 into the recess 36; also, outward deformation of the lock ring radially outwardly compresses the ring against the head counterbore 22. A solid, tight, interlocked, three piece, deformed fastener structure is thereby obtained, resisting vibration induced dynamic motion of the lock ring, to insure against loosening and failure. Note "bulb" formation at 92 as the pin is retracted rightwardly toward the position shown, the pin taper 60 acting to expand fastener tubular shank material to assist in bulb formation.

Figure 14:
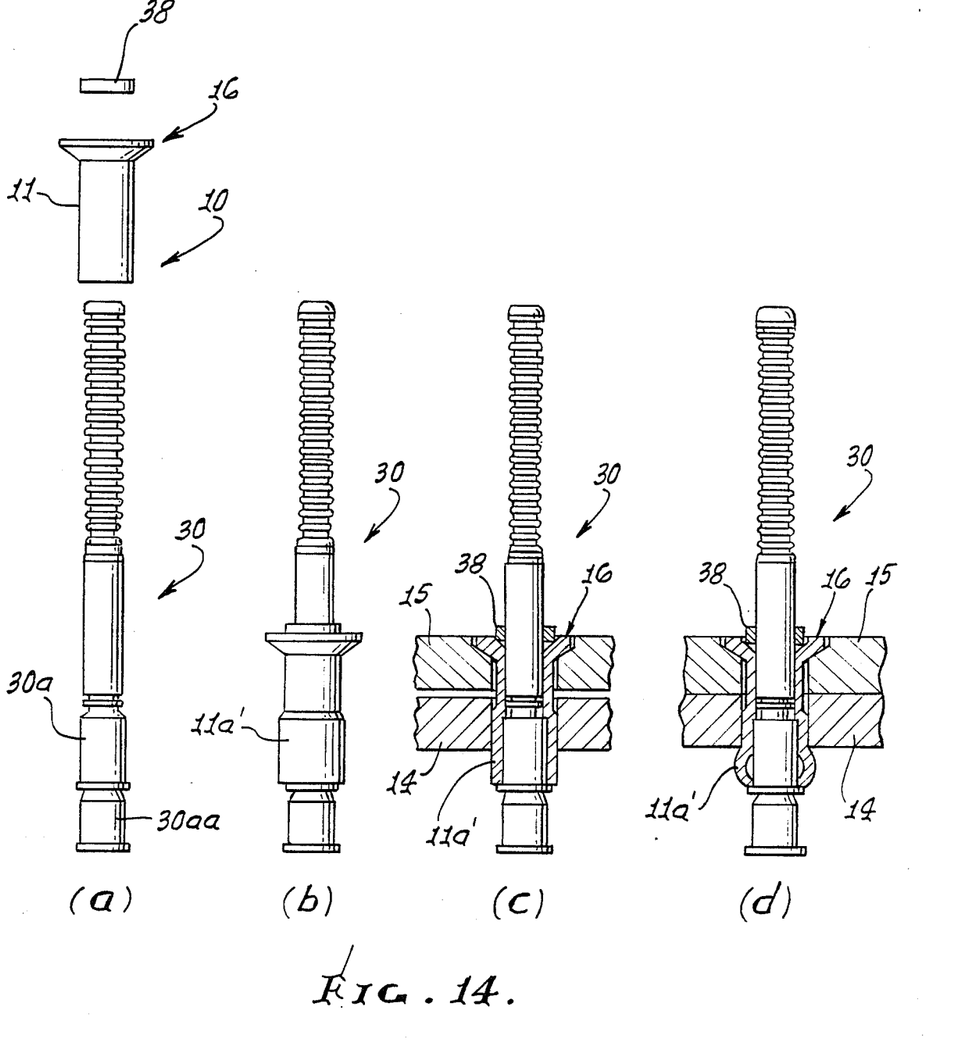
FIG. 14 shows installation procedure.

FIG. 14 shows an installation sequence, (a)–(h). In particular, note the pre-expanded assembly, i.e. expanded shank 11a' in (b), so as to be pre-stressed and take up looseness at the pin and bore. This will result in a larger "foot-print" indicated at 74 in (e), and better "clamp-up" conditions seen in (f), (g), and (h). Also better clamp-up retention is achieved. See also FIG. 6 in these regards, and to which FIG. 14 (h) corresponds.

Figure 15:
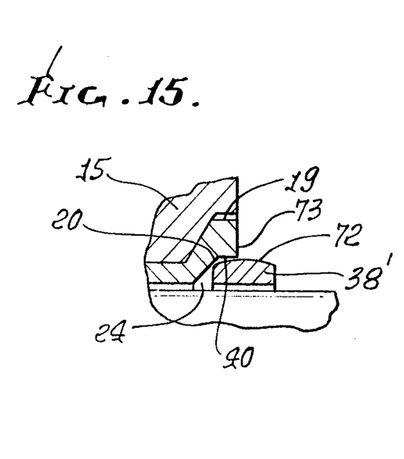
FIG. 15 shows a modified lock ring in section.

FIG. 15 is a fragmentary view, like the lock ring area of FIG. 1; but, it shows a modified lock ring 381 having a barrel-shaped outer surface 72. The crest of the barrel surface fits into recess bore 40 as the ring is pushed toward and into recess 24; however, during ring deformation as into groove 36 in the pin, the ring has less tendency to deform outwardly unto overlapping relation to head end surface 73, due to its barrel curvature.

Also, the ring 38 or 38' may be a split ring, i.e. C-shaped but with opposite ends in closely opposed relation. The ring is typically metallic and may consist of aluminum, titanium colombium alloy, or other ductile material. The pin may consist of stainless steel, titanium, heat treatable aluminum alloy, or other suitably hard material, preferably corrosion resistant.

I claim:

1. In a tubular fastener having an axially extending tubular shank receivable in a work bore and an annular head receivable in forcible engagement with the work material forming a counterbore, and in combination with said work, the improvement comprising
   (a) the head having an annular end face, a first section located forwardly of said end face and having an outer annular and cylindrical surface to be urged in a radially outward direction to take up initial clearance formed between said head cylindrical surface and the work counterbore and to forcibly engage the work counterbore, and a second forwardly tapered section located forwardly of the first section,
   (b) a pin extending within the tubular shank, and a stem connected to the pin and extending endwise therefrom and from said tubular fastener, the pin sized to radially outwardly compress the tubular shank thereby acting to urge the head first section outer annular surface in said radially outward direction, as the pin is displaced in said shank toward the head,
   (c) expansion means responsive to said displacement of the pin toward the head end of the fastener to expand the fastener shank at the opposite end of the fastener and axially retain the fastener in position with the head first section forcibly engaging the counterbore,
   (d) the head defining a first recess which is annular and sunk axially forwardly from said end face, outwardly of a cylinder defined by a bore of said tubular shank,
   (e) the pin defining a peripheral annular recess sunk radially inwardly and located to be brought into proximity to said first recess,
   (f) an annular lock ring on the stem to be forcibly deformed to extend into both of said recesses in response to said retraction of the pin toward the head, and to exert force acting to compress the head first section against the work counterbore,
   (g) the head expanded to cause the periphery of said end face to engage the work counterbore at the mouth thereof, and said annular cylindrical surface forcibly engaging the counterbore.

2. The fastener of claim 1 wherein said initial clearance is located between said head first section outer annular surface and said work counterbore at a location where the work counter bore is cylindrical and annular.

3. The fastener of claim 2 wherein the head first section outer annular surface that is initially substantially cylindrical is located directly radially inwardly of the cylindrical and annular counterbore.

4. The fastener of claim 1 wherein there is initial clearance between the pin and a bore defined by the tubular shank.

5. The fastener of claim 4 wherein said tubular shank bore is locally frusto-conically tapered in an axial direction toward said head at a first locus proximate the head.

6. In a tubular fastener having an axially extending tubular shank receivable in a work bore and an annular head receivable in forcible engagement with the work material forming a counterbore, and in combination with said work, the improvement comprising
   (a) the head having an annular end face, a first section located forwardly of said end face and having an outer annular and cylindrical surface to be urged in a radially outward direction to forcibly engage the work counterbore, and a second forwardly tapered section located forwardly of the first section,
   (b) a pin extending within the tubular shank, and a stem connected to the pin and extending endwise therefrom and from said tubular fastener, the pin sized to radially outwardly compress the tubular shank thereby acting to urge the head first section outer annular surface in said radially outward direction, as the pin is displaced in said shank toward the head,
   (c) expansion means responsive to said displacement of the pin toward the head end of the fastener to expand the fastener shank at the opposite end of the fastener and axially retain the fastener in position with the head first section forcibly engaging the counterbore,
   (d) the head defining a first recess which is annular and sunk axially forwardly from said end face, outwardly of a cylinder defined by a bore of said tubular shank,
   (e) the pin defining a peripheral annular recess sunk radially inwardly and located to be brought into proximity to said first recess,
   (f) an annular lock ring on the stem to be forcibly deformed to extend into both of said recesses in response to said retraction of the pin toward the head, and to exert force acting to compress the head first section against work counterbore,
   (g) there being initial clearance between the pin and a bore defined by the tubular shank, the tubular shank bore being locally frusto-conically tapered in an axial direction toward said head at a first locus proximate the head,
   (h) said tubular shank being locally frusto-conically tapered in an axial direction toward the head, at a second locus spaced from said first locus, whereby the pin is forcibly engageable with said second taper to expand the tubular shank in response to said retraction of the stem toward the head end of the fastener.

7. The fastener of claim 1 wherein said expansion means includes two axially spaced flanges on the pin and positioned to cause radially outward expansion of an end section of the tubular shank deformed to extend about said spaced flanges as the pin is displaced in the tubular shank toward said head.

8. The fastener of claim 7 wherein the flanges retain their spacing as the pin is displaced toward said head.

9. The fastener of claim 7 wherein the second flange closer to the head is displaced relatively toward the other flange in response to pin displacement toward the head, the end section of the shank also being endwise compressed to be thicker, radially.

10. The fastener of claim 8 wherein the pin is tapered axially toward the head generally between that flange closer to the head and the pin recess.

11. The fastener of claim 9 wherin the pin is tapered axially toward the head generally between the original position of the flange closer to the head and the pin recess.

12. The fastener of claim 9 wherein along the pin length between the second flange and the head there is interference between the pin and tubular shank along the pin length closest to the second flange, and there is interference between the pin and the tubular shank along the pin length closest to the head.

13. The fastener of claim 8 wherein the tubular shank end sections form radially spaced apart, annular, inner and outer, sub-sections.

14. The fastener of claim 9 wherein the tubular shank end section forms radially spaced apart, annular, axially fore-shortened, inner and outer sub-sections.

15. The method of positively locking a tubular fastener to work bore an counterbore, the fastener having a tubular shank in the bore and an annular head in said work counterbore, the head defining a counterbore, the head having an annular end face, a first section located forwardly of said end face and having an outer annular and cylindrical surface to be urged in a radially outward direction to forcibly engage the work counterbore, and a second forwardly tapered section located forwardly of the first section, and employing a pin received in a bore defined by said tubular shank, and a lock ring, the pin defining a peripheral recess, the steps including:
   (a) retracting the pin axially endwise in the shank bore in a first axial direction toward the head and in a manner to exert radially compressive loading on the tubular shank, which in turn acts to urge the head radially outwardly toward the work counterbore,
   (b) continuing said retraction of the pin to bring the recess therein proximate the head counterbore, and
   (c) forcibly driving the lock ring in the opposite axial direction to deform the ring into said pin recess and in said head counterbore to exert radially compressive loading on the head compressively urging the head radially against the work counterbore,
   (d) there being initial radial clearance between the head first section outer annular and cylindrical surface and the work counterbore, and said radial expansion of the head by said lock ring being carried out to cause the expanding head to fully take-up said clearance at and proximate the periphery of said end face, and to cause said outer annular and cylindrical surface to forcibly engage the work counterbore.

16. The method of positively locking a tubular fastener to a workbore and counterbore, the fastener having a tubular shank in the workbore and an annular head in the work counterbore, the head also defining a counterbore, the head having an annular end face, a first section located forwardly of said end face and having an outer annular and cylindrical surface to be urged in a radially outward direction to forcibly engage the work counterbore, and a second forwardly tapered section located forwardly of the first section, and employing a pin received in a bore defined by said tubular shank, and a lock ring, the pin defining a peripheral recess sunk toward the pin axis, the steps that include:
   (a) retracting the pin relatively axially endwise in the shank by exerting axial force and transmitting said force from the pin to a section of the shank projecting from the workbore to deform said section, thereby forming a bulb that grips the side of the work opposite said work counterbore, and bringing said pin recess into proximity to said head counterbore,
   (b) deforming the ring to penetrate and lock into the pin recess and also within the head counterbore, and to exert radially outward force against the head acting to radially compress the head against the work counterbore, whereby the deformed ring, the compressed head, and the pin locked to the deformed ring material together form a solid interlocked unit,
   (c) there being initial radial clearance between the head first section outer annular and cylindrical surface and the work counterbore, and said radial expansion of the head by said lock ring being carried out to cause the expanding head to fully take-up said clearance at a proximate the periphery of said end face, and to cause said outer annular and cylindrical surface to forcibly engage the work counterbore.

17. The method of claim 16 wherein the pin has an outer surface that is tapered in an axial direction toward the head, and said step (a) retraction of the pin acts to bring said tapered surface into engagement with a bore defined by the tubular shank after formation of most of the bulb, whereby continued axial retraction of the pin acts to transmit force from the pin to the tubular shank for urging the shank compressively outwardly against the workbore.

18. The method of claim 17 wherein the workbore is tapered along length thereof facing the pin tapered surface, and said retraction of the pin effects interengagement of the pin surface taper with the bore taper just prior to arrival of the pin recess at proximity to said head counterbore.

19. The method of claim 16 wherein an axial stem is integrally connected to the pin at a break-away locus, and said retraction of the pin is effected by exerting pulling force on the stem and until the stem breaks away from the pin after the ring is deformed as set forth in step (b).

20. The method of claim 16 wherein there is initial radial clearance between the head and the work counterbore, and said step (b) deformation of the ring acts to radially expand the head to take up said clearance while the head remains in position in the work counterbore.

21. In a tubular fastener having an axially extending tubular shank receivable in a work bore and an annular head receivable in forcible engagement with the work material forming a counterbore, and in combination with said work, the inprovement comprising:
   (a) the head having an annular end face, a first section located forwardly of said end face and having an outer annular and cylindrical surface to be urged in a radially outward direction to take up initial clearance formed between said head cylindrical surface and the work counterbore and to forcibly engage the work counterbore, and a second forwardly tapered section located forwardly of the first section, (b) a pin extending within the tubular shank, and a stem connected to the pin and extending endwise therefrom and from said tubular fastener, (c) means responsive to said displacement of the pin toward the head end of the fastener to expand the fastener shank at the opposite end of the fastener and axially retain the fastener in position with the head first section forcibly engaging the counterbore, (d) the head defining a first recess which is annular and sunk axially forwardly from said end face, outwardly of a cylinder defined by a bore of said tubular shank, (e) the pin defining a peripheral annular recess sunk radially inwardly and located to be brought into proximity to said first recess, (f) an annular lock ring on the stem to be forcibly deformed to extend into both of said recesses in response to said retraction of the pin toward the head, and to exert force acting to compress the head first section against the work counterbore, to provide a tightly interlocking assembly, (g) the head expanded to cause the periphery of said end face to engage the work counterbore at the mouth thereof, and said annular cylindrical surface forcibly engaging the counterbore.

22. The fastener of claim wherein there is initial interference between the pin and a bore defined by the tubular shank.

23. The fastener of claim 1 wherein the lock ring has a cylindricl outer surface.

24. The fastener of claim 1 wherein the lock ring has a barrel-shaped outer surface.

* * * * *